(12) United States Patent
Sasaoka et al.

(10) Patent No.: US 8,830,407 B2
(45) Date of Patent: Sep. 9, 2014

(54) DISPLAY DEVICE AND TELEVISION SET

(71) Applicant: Funai Electric Co., Ltd., Osaka (JP)

(72) Inventors: Hiromasa Sasaoka, Osaka (JP); Yuto Suzuki, Osaka (JP); Akifumi Kono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/046,292

(22) Filed: Oct. 4, 2013

(65) Prior Publication Data

US 2014/0118630 A1    May 1, 2014

(30) Foreign Application Priority Data

Oct. 29, 2012 (JP) ................................ 2012-238207

(51) Int. Cl.
| | |
|---|---|
| *H04N 5/64* | (2006.01) |
| *H04N 5/70* | (2006.01) |
| *H04N 5/66* | (2006.01) |
| *G02F 1/1335* | (2006.01) |

(52) U.S. Cl.
CPC ................ *G02B 6/0091* (2013.01); *H04N 5/66* (2013.01); *G02B 6/0085* (2013.01); *G02F 1/133615* (2013.01)
USPC ............................ 348/794; 348/787; 348/801

(58) Field of Classification Search
CPC ....... H04N 1/00519; H04N 5/44; H04N 5/66; H04N 5/645
USPC ........................................................ 348/790
See application file for complete search history.

(56) References Cited

U.S. PATENT DOCUMENTS

| | | | |
|---|---|---|---|
| 2007/0263407 A1 | 11/2007 | Sakai | |
| 2009/0091688 A1* | 4/2009 | Tanaka et al. | 349/65 |
| 2012/0194760 A1* | 8/2012 | Fukuda | 349/58 |
| 2012/0236207 A1 | 9/2012 | Fukuda | |
| 2013/0135901 A1 | 5/2013 | Ishimoto | |

FOREIGN PATENT DOCUMENTS

| | | | | |
|---|---|---|---|---|
| JP | 2003-338214 A | | 11/2003 | |
| JP | 2008-078010 A | | 4/2008 | |
| JP | 2008-97877 A | | 4/2008 | |
| WO | WO2011089805 | * | 7/2011 | ............... H04N 5/64 |
| WO | 2012020593 A1 | | 2/2012 | |

OTHER PUBLICATIONS

Extended European Search Report of the corresponding European Application No. 13189928.8, dated Feb. 17, 2014.

\* cited by examiner

*Primary Examiner* — Jefferey Harold
*Assistant Examiner* — Michael Teitelbaum
(74) *Attorney, Agent, or Firm* — Global IP Counselors, LLP

(57) ABSTRACT

A display device includes a display component, a light source, a light guide plate, a spacer member, and a biasing member. The display component displays images. The light source emits light. The light guide plate guides the light emitted from the light source to the display component. The light guide plate has a light incident face on which the light emitted from the light source is directly incident. The spacer member is disposed in a region other than where the light guide plate and the light source are opposite each other such that the spacer member maintains a specific spacing between the light source and the light incident face of the light guide plate. The biasing member is arranged to bias one of the light source and the light guide plate towards the other of the light source and the light guide plate.

8 Claims, 7 Drawing Sheets

DISPLAY DEVICE AND TELEVISION SET

CROSS-REFERENCE TO RELATED APPLICATIONS

This application claims priority to Japanese Patent Application No. 2012-238207 filed on Oct. 29, 2012. The entire disclosure of Japanese Patent Application No. 2012-238207 is hereby incorporated herein by reference.

BACKGROUND

1. Field of the Invention

The present invention generally relates to a display device and a television set. More specifically, the present invention relates to a display device and a television set that include a light source and a light guide plate.

2. Background Information

A conventional display device having a light source and a light guide plate is known (see Japanese Laid-Open Patent Application Publication No. 2008-97877 (Patent Literature 1), for example).

The above-mentioned Patent Literature 1 discloses a planar lighting device (e.g., a display device) including a point light source (e.g., a light source), a light guide plate, a transparent spacer (e.g., a spacer member), and an elastic member. The light guide plate has an incoming light prism (e.g., light incident face) where light emitted from the point light source is incident. The transparent spacer is disposed between the light guide plate and the point light source. The elastic member biases the light guide plate in a direction in which the light guide plate and the point light source move closer together. With this planar lighting device, the transparent spacer is disposed in a state of contacting with the light guide plate and the point light source. This maintains a constant spacing between the light guide plate and the point light source, and allows light emitted from the point light source to be efficiently incident on the light guide plate.

SUMMARY

It has been discovered that with the planar lighting device in Patent Literature 1, since the transparent spacer is disposed between the light guide plate and the point light source and contacts each of them, when the light guide plate has undergone thermal expansion, or when the planar lighting device is subjected to an impact, for example, the light guide plate and the point light source are biased toward each other via the transparent spacer. As a result there is the risk that the point light source will be damaged.

One object of the present disclosure is to provide a display device and a television set with which damage to a light source can be suppressed while light can be efficiently emitted from the light source and incident on a light guide plate, even when the light guide plate has undergone thermal expansion or when the display device is subjected to an impact.

In view of the state of the know technology, a display device includes a display component, a light source, a light guide plate, a spacer member, and a biasing member. The display component is configured to display images. The light source is configured to emit light. The light guide plate is configured to guide the light emitted from the light source to the display component. The light guide plate has a light incident face on which the light emitted from the light source is directly incident. The spacer member is disposed in a region other than where the light guide plate and the light source are opposite each other such that the spacer member maintains a specific spacing between the light source and the light incident face of the light guide plate. The biasing member is arranged to bias one of the light source and the light guide plate towards the other of the light source and the light guide plate.

Other objects, features, aspects and advantages of the present disclosure will become apparent to those skilled in the art from the following detailed description, which, taken in conjunction with the annexed drawings, discloses a preferred embodiment of a display device and a television set.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Referring initially to FIGS. 1 to 6, a TV (television set) 100 is illustrated in accordance with an embodiment of the present disclosure. The TV 100 is an example of the "display device" of the present invention.

Figure 1:
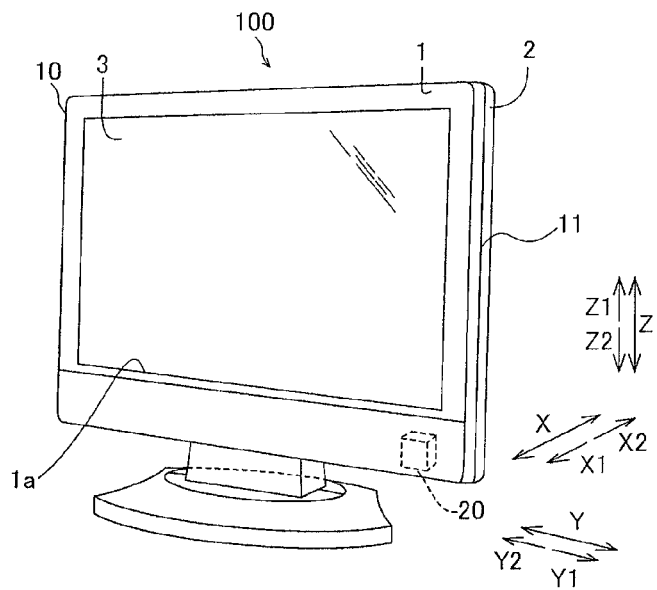
FIG. 1 is a perspective view of an overall configuration of a TV in accordance with one embodiment.

As shown in FIG. 1, the TV 100 basically includes a front frame 1, a rear frame 2, and a display component 3. The TV 100 is configured such that the display component 3 that displays images is exposed from an opening 1a in the front frame 1. The display component 3 includes a liquid crystal cell, for example.

As shown in FIGS. 2 to 6, the TV 100 further includes a heat sink 4, an LED module 5, a reflector sheet 6, a light guide plate 7, an optical sheet (not shown), a plurality of silicone rubber pieces 8, and a plurality of spacer members 9. The LED module 5 includes a plurality of LEDs 52 (discussed below). The heat sink 4 and the LED module 5 are disposed inside the TV 100. The reflector sheet 6, the light guide plate 7, and the optical sheet (not shown) are stacked in this order, starting from the rear (the X2 direction side), on the front side (the X1 direction side) of the heat sink 4. The spacer members 9 are attached on the LED module 5. The TV 100 is configured such that it can receive broadcast signals with a receiver 20 (see FIG. 1) in a conventional manner. The LEDs 52 are an example of the "light source" of the present invention.

Figure 2:
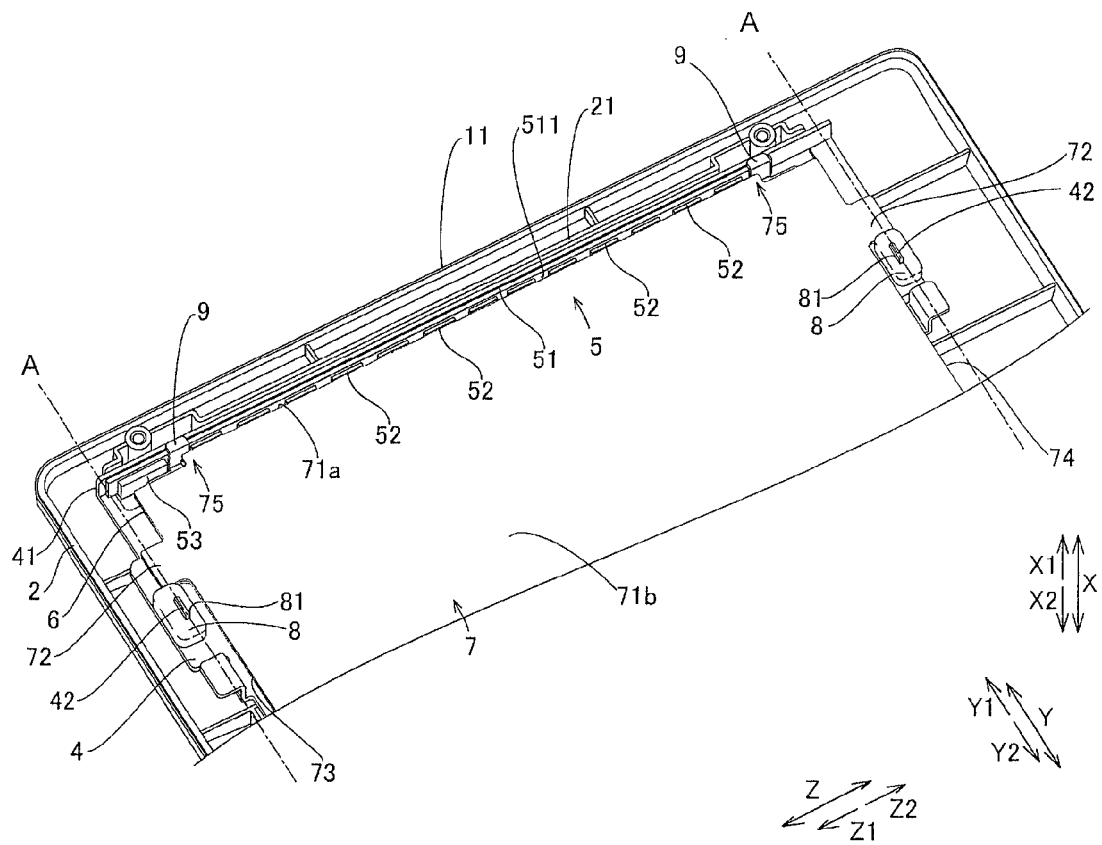
FIG. 2 is a partial perspective view of an inside configuration of the TV illustrated in FIG. 1, illustrating a portion where a plurality of LEDs and a light guide plate of the TV are opposite each other.
Figure 3:
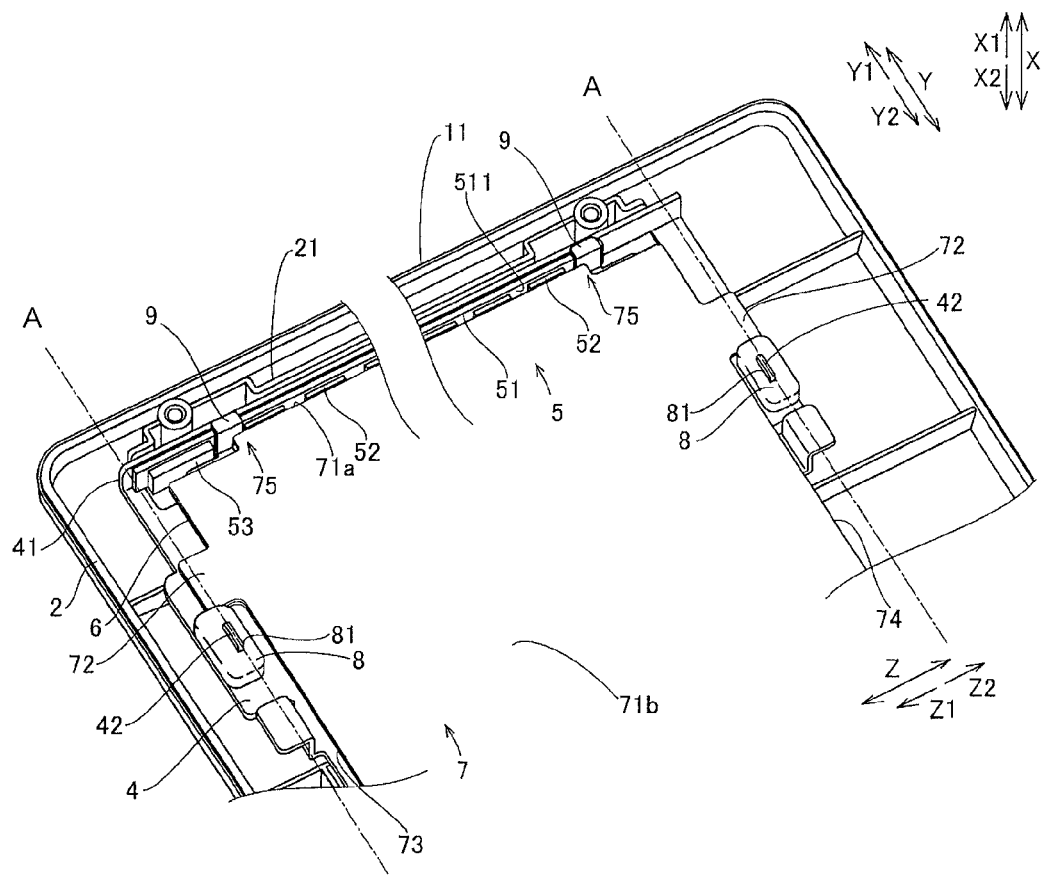
FIG. 3 is an enlarged, partial perspective view of the portion where the LEDs and the light guide plate of the TV are opposite each other.
Figure 4:
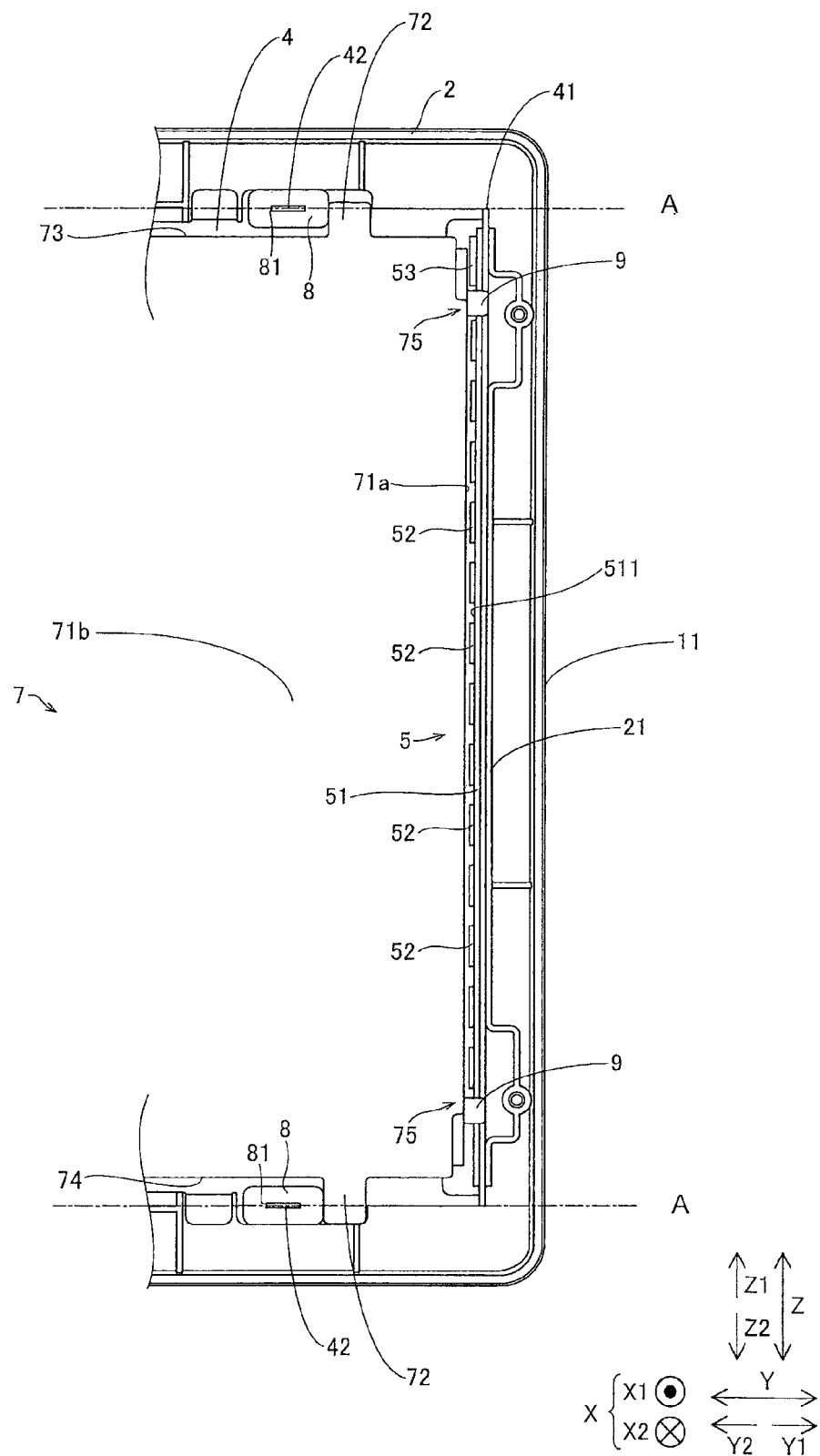
FIG. 4 is a partial elevational view of the inside configuration of the TV illustrated in FIG. 1, illustrating the portion where the LEDs and the light guide plate inside the TV are opposite each other.
Figure 5:
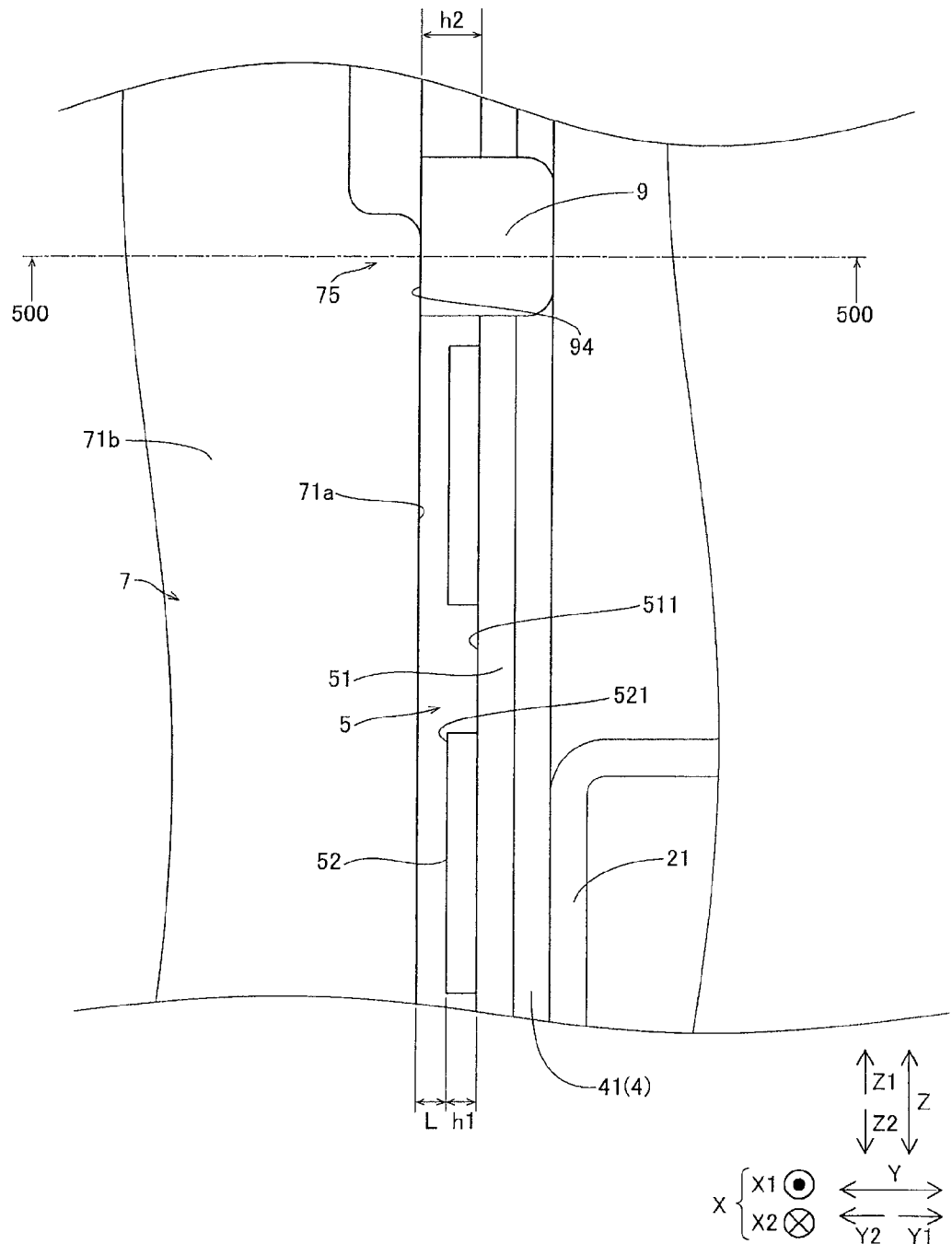
FIG. 5 is an enlarged, partial elevational view of the portion where the LEDs and the light guide plate inside the TV are opposite each other.
Figure 6:
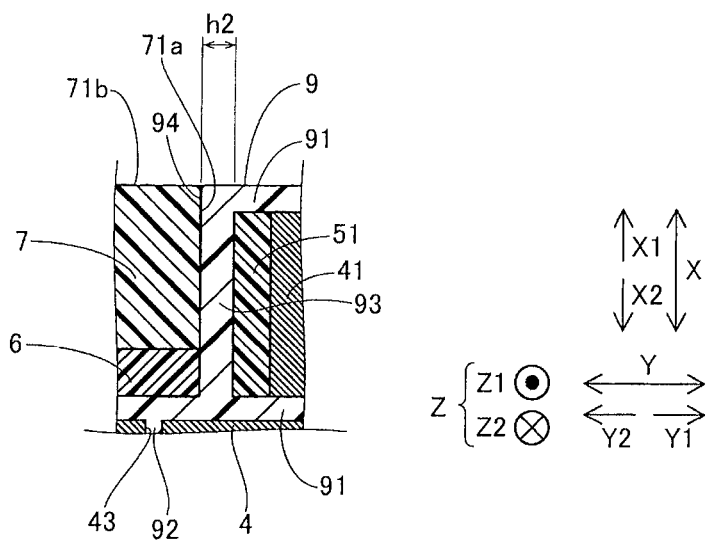
FIG. 6 is a cross sectional view taken along 500-500 line in FIG. 5.

In this embodiment, the heat sink 4 has the function of radiating the heat of the LEDs 52. The heat sink 4 is made of metal, such as sheet metal. The heat sink 4 is integrally formed as a one-piece, unitary member. As shown in FIGS. 2, 3, and 6, the heat sink 4 is provided on the opposite side (the X2 direction side) from a light emission face 71b of the light guide plate 7. The heat sink 4 has a bent part 41 and a plurality of raised parts 42. The bent part 41 is formed on the Y1 direction side of the heat sink 4 along an edge of the heat sink 4, and is bent substantially at a right angle to the X1 direction. The raised parts 42 are integrally formed with the heat sink 4 by cutting and raising at both ends of the heat sink 4 in the Z direction. The raised parts 42 are formed one at each end of the heat sink 4 in the Z direction. The raised parts 42 are spaced apart from the bent part 41 in the Y2 direction. The raised parts 42 are formed such that the raised parts 42 protrude to the light guide plate 7 side (the X1 direction side). As shown in FIGS. 2 to 5, the heat sink 4 is configured such that movement in the Y1 direction is restricted by a retainer 21 formed substantially perpendicular in the X1 direction, on the Y1 direction side of the rear frame 2. The raised parts 42 are an example of the "biasing member support" in the present invention. In the illustrated embodiment, the X direction, the Y direction and the Z direction are perpendicular to each other. The Y direction corresponds to a horizontal direction of the TV 100, while the Z direction corresponds to a vertical direction of the TV 100. Furthermore, in the illustrated embodiment, the X1 direction corresponds to a front side of the TV 100, while the X2 direction corresponds to a rear side of the TV 100. Moreover, in the illustrated embodiment, the Z1 direction corresponds to an upper side of the TV 100, while the Z2 direction corresponds to a lower side of the TV 100.

The LED module 5 is configured to supply light to the display component 3. As shown in FIGS. 2 to 4, the LED module 5 includes an LED board 51, the plurality of the LEDs 52 that is mounted to the LED board 51, and a connector 53 that supplies power to the LED board 51. The LED module 5 is disposed on the right side (the Y1 direction side) of the TV 100 when a TV main body 10 (see FIG. 1) is viewed from the front. The TV main body 10 mainly includes the front and rear frame 1 and 2. It is also configured such that the Y1 direction side of the LED module 5 (the LED board 51) is fixed by double-sided tape on the Y2 direction side of the bent part 41 of the heat sink 4. The plurality of the LEDs 52 is disposed along a side edge 11 of the TV on the Y1 direction side of the TV main body 10. As shown in FIG. 5, the LEDs 52 are configured such that the LEDs 52 have a height h1 measured in the Y direction from a face 521 on the Y2 direction side to a surface 511 on the Y2 direction side of the LED board 51 on which the LEDs 52 are mounted. The LED board 51 is an example of the "light source substrate" in the present invention.

The reflector sheet 6 has the function of suppressing the leakage of light from the light guide plate 7 in the X2 direction. As shown in FIGS. 2 and 3, the reflector sheet 6 is formed in substantially the same shape as the light guide plate 7 as viewed in the X direction. The reflector sheet 6 is configured so as not to stick out from the heat sink 4.

In this embodiment, the light guide plate 7 also has the function of guiding light to the display component 3. As shown in FIGS. 2 to 6, the light guide plate 7 also has a light incident face 71a where light emitted from the LEDs 52 is directly incident. The light incident face 71a is disposed opposite the LEDs 52. The configuration is such that light that goes into the light guide plate 7 comes out of a light emission face 71b of the light guide plate 7. The light guide plate 7 is formed in a substantially rectangular shape (see FIG. 2). The light guide plate 7 further includes a pair of convex components 72 provided to the upper and lower edges. More specifically, as shown in FIGS. 2 to 4, the convex components 72 are provided one each on the edge 73 on the Z1 direction side and the edge 74 on the Z2 direction side of the light guide plate 7. The convex components 72 are disposed near (on the Y1 direction side) the light incident face 71a of the light guide plate 7. As shown in FIG. 5, the light guide plate 7 is disposed such that there is a specific spacing L between the light incident face 71a of the light guide plate 7 and the face 521 of the LEDs 52 on the Y1 direction side. The light guide plate 7 is deformed (expanded or contracted) by temperature changes attributable to the light emitted from the LEDs 52. In this case, the amount of deformation (amount of expansion or contraction) of the light guide plate 7 becomes more pronounced in proportion to the distance from the light incident face 71a. The light guide plate 7 is integrally formed as a one-piece, unitary member.

As shown in FIGS. 2 to 4, in this embodiment, the silicone rubber pieces 8 are provided to the heat sink 4. The silicone rubber pieces 8 bias the light guide plate 7 in a direction in which the light guide plate 7 and the LEDs 52 move closer together. The silicone rubber pieces 8 have a substantially rectangular shape when seen in plan view. The silicone rubber pieces 8 are integrally formed as a one-piece, unitary member, respectively. The silicone rubber pieces 8 have holes 81 (center hole) corresponding to the raised parts 42 of the heat sink 4, respectively. Also, the silicone rubber pieces 8 are attached to the heat sink 4 by inserting the raised parts 42 of the heat sink 4 into the holes 81, respectively. The silicone rubber pieces 8 are also disposed at locations corresponding to the pair of convex components 72 of the light guide plate 7.

The configuration is also such that in a state in which the silicone rubber pieces 8 and the light guide plate 7 are disposed on the heat sink 4, the silicone rubber pieces 8 are squeezed and elastically deformed between the light guide plate 7 (convex components 72) and the raised parts 42 of the heat sink 4. For example, the silicone rubber pieces 8 are elastically deformed by about 0.7 mm in the Y2 direction by the light guide plate 7 (convex components 72). Consequently, the configuration is such that the convex components 72 of the light guide plate 7 are biased by the silicone rubber pieces 8 toward the plurality of the LEDs 52 (in the Y1 direction) provided along the side edge 11 of the TV main body 10. Specifically, the silicone rubber pieces 8 bias the light guide plate 7 against the spacer members 9.

Also, the silicone rubber pieces 8 are provided in a region with little deformation (expansion or contraction) of the light guide plate 7 when the light guide plate 7 has been deformed by a temperature change. More specifically, as shown in FIGS. 2 to 4, the silicone rubber pieces 8 are disposed near the light incident face 71a of the light guide plate 7, which is close to the LEDs 52 serving as the heat source. For example, the silicone rubber pieces 8 are disposed at positions approximately 10 cm apart from the light incident face 71a of the light guide plate 7 toward the Y2 direction. The silicone rubber pieces 8 are an example of the "biasing member" and the "elastic member" in the present invention.

As shown in FIGS. 2 to 5, in this embodiment, the spacer members 9 are disposed such that the spacer members 9 fill in the gap between the light incident face 71a of the light guide plate 7 and a region that is the surface 511 of the LED board 51 on the side where the LEDs 52 are mounted, but not where the LEDs 52 are disposed. Also, as show in FIG. 6, the spacer members 9 each include a pair of legs 91, a boss 92, and a sandwiched part 93. The two legs 91 are formed on each of the spacer members 9 such that the legs 91 extend in the Y1 direction. Also, the spacer members 9 are disposed such that the two legs 91 will sandwich the LED board 51 and the bent part 41 of the heat sink 4. Also, the bosses 92 are formed in the X2 direction of the spacer members 9. Holes 43 having a shape that corresponds to the shape of the bosses 92 are provided at locations of the heat sink 4 corresponding to the bosses 92. The bosses 92 engage with the holes 43, making it possible to reduce shifting of the position of the spacer members 9 in the assembly of the TV 100.

As shown in FIG. 5, the spacer members 9 have the function of maintaining a specific spacing L between the light incident face 71a of the light guide plate 7 and the LEDs 52 (the face 521). Also, the spacer members 9 are configured such that the spacer members 9 have a height h2 at the sandwiched parts 93 sandwiched between the light guide plate 7 and the LED board 51 (see FIG. 6) in a state of having been attached to the LED module 5 (the LED board 51). The height h2 of the spacer members 9 is designed to be greater than the height h1 of the LEDs 52 in the Y2 direction. As shown in FIGS. 2 to 5, the spacer members 9 are configured such that contact faces 94 of the spacer members 9 contact with the ends 75 on the Z direction sides of the light incident face 71a of the light guide plate 7.

As shown in FIGS. 2 to 5, the spacer members 9 is also disposed in a region other than the region where the light guide plate 7 and the LEDs 52 are opposite each other. More specifically, the spacer members 9 are provided one each to the outside in the Z direction of the LEDs 52 mounted on the LED module 5 of the LED board 51. Also, as shown in FIGS. 2 to 4, the spacer members 9 are provided near positions corresponding to the convex components 72 of the light guide plate 7. The spacer members 9 are also disposed near action lines A where biasing force is exerted when the silicone rubber pieces 8 bias the light guide plate 7 (the convex components 72). The spacer members 9 are molded from resin. Specifically, the spacer members 9 are integrally molded as a one-piece, unitary member.

In this embodiment, as discussed above, the spacer members 9 are disposed in a region other than the region where the light guide plate 7 and the LEDs 52 are opposite each other. The spacer members 9 are used to maintain the specific spacing L between the LEDs 52 and the light incident face 71a of the light guide plate 7. The silicone rubber pieces 8 bias the light guide plate 7 in a direction in which the light guide plate 7 and the LEDs 52 move closer together. Consequently, even when the light guide plate 7 has undergone thermal expansion or when the TV 100 is subjected to an impact, the spacer members 9 and the LEDs 52 are prevented from contacting with each other. Thus, there is less chance that the LEDs 52 will be damaged. Also, since the spacing L between the LEDs 52 and the light incident face 71a of the light guide plate 7 is kept constant by the spacer members 9, light from the LEDs 52 can be efficiently incident on the light guide plate 7. And since the spacer members 9 are not disposed in the region where the light guide plate 7 and the LEDs 52 are opposite each other, light emitted by the LEDs 52 can be directly incident on the light guide plate 7. As a result, light can be efficiently incident on the light guide plate 7.

In this embodiment, as discussed above, the spacer members 9 are disposed to fill in the gap between the light incident face 71a of the light guide plate 7 and a region that is the surface 511 of the LED board 51, but not where the LEDs 52 are disposed. Consequently, the spacer members 9 can be disposed in a region that is the surface 511 of the LED board 51, but not where the LEDs 52 are disposed, and contact between the spacer members 9 and the LEDs 52 can be easily suppressed while allowing light from the LEDs 52 to be efficiently and directly incident on the light guide plate 7.

In this embodiment, as discussed above, the spacer members 9 are disposed near the action lines A where the biasing force is exerted when the silicone rubber pieces 8 bias the light guide plate 7. Consequently, the rotational force (moment force) around the spacer members 9 produced by the biasing force that is exerted on the light guide plate 7 can be reduced near where the spacer members 9 are provided. Thus, the light guide plate 7 on which the biasing force is exerted will be less likely to end up rotating around the spacer members 9. This allows the spacing L to be kept constant between the light guide plate 7 and the LEDs 52.

In this embodiment, as discussed above, the silicone rubber pieces 8 are provided to bias the light guide plate 7 to the side of the LEDs 52 and to be disposed near the light incident face 71a of the light guide plate 7. Consequently, it is possible to bias the portion with a shorter distance from the heat source (LEDs 52), which is a region of less deformation (expansion and contraction) when the light guide plate 7 undergoes thermal expansion. Thus, the separation of the silicone rubber pieces 8 and the light guide plate 7 can be suppressed even when the light guide plate 7 is deformed by heat. As a result, the light guide plate 7 can be biased more reliably to the side of the LEDs 52.

In this embodiment, as discussed above, the metal heat sink 4 is provided on the opposite side from the light emission face 71b of the light guide plate 7. The raised parts 42 that protrude on the light guide plate 7 side are formed integrally with the heat sink 4. The silicone rubber pieces 8 are attached to the raised parts 42. Consequently, since the raised parts 42 to which the silicone rubber pieces 8 are attached can be formed integrally with the heat sink 4, fewer parts are needed than when the raised parts 42 are provided separately.

In this embodiment, as discussed above, the plurality of the LEDs 52 is disposed along the side edge 11 of the TV main body 10. The light guide plate 7 is formed in a substantially rectangular shape. The pair of the convex components 72 is provided to the pair of edges 73 and 74. Also, the silicone rubber pieces 8 are disposed at positions corresponding to the pair of the convex components 72 of the light guide plate 7. The spacer members 9 are provided near positions corresponding to the convex components 72 of the light guide plate 7. The convex components 72 of the light guide plate 7 are biased by the silicone rubber pieces 8 toward the LEDs 52 provided along the side edge 11. Consequently, the edges 73 and 74 on both sides of the light guide plate 7 can be evenly biased toward the LEDs 52 disposed on the side edge 11. Thus, a constant spacing can be easily maintained between the LEDs 52 and the light incident face 71a of the light guide plate 7. Also, unlike the case in which the light guide plate is biased to the side of the LEDs by the weight of the light guide plate when the LEDs are disposed along the lower edge (lower part) of the TV main body, even if the LEDs 52 are disposed along the side edge 11, the light guide plate 7 can be biased by the silicone rubber pieces 8 toward the side edge 11 and a constant spacing can be maintained between the LEDs 52 and the light incident face 71*a* of the light guide plate 7.

The embodiment disclosed herein is just an example in every respect, and should not be interpreted as being limiting in nature. The scope of the invention being indicated by the appended claims rather than by the above description of the embodiments, all modifications within the meaning and range of equivalency of the claims are included.

For example, in the illustrated embodiment, an example is given of applying the present invention to the TV (television set) 100 as a display device. However, the present invention is not limited to this. The present invention can also be applied to a PC (personal computer) monitor or other such display device.

Figure 7:
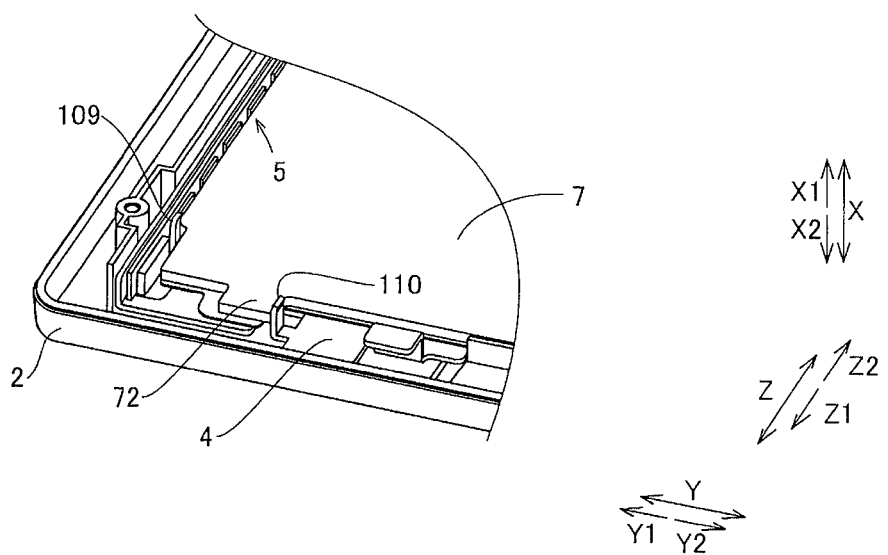
FIG. 7 is an enlarged, partial perspective view of an inside configuration of a TV in accordance with a first modification example.
Figure 8:
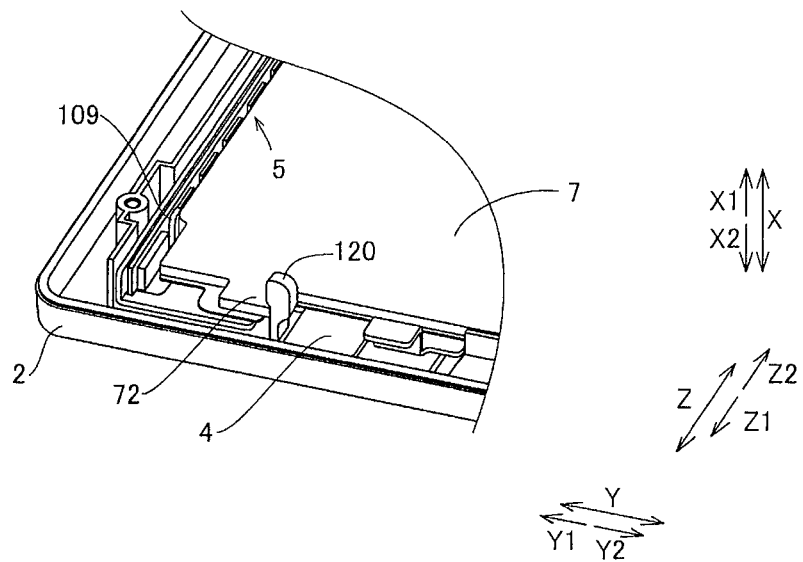
FIG. 8 is an enlarged, partial perspective view of an inside configuration of a TV in accordance with a second modification example.

In the illustrated embodiment, an example is given in which silicone rubber pieces 8 are provided as an example of an elastic member serving as a biasing member of the present invention. However, the present invention is not limited to or by this. In addition to being the silicone rubber pieces 8, the elastic member serving as the biasing member can also be, for example, a metal spring, a plastic spring, a foam, or a coil spring. Specifically, as a first modification example shown in FIG. 7, a pair of leaf springs 110 (only one is shown in FIG. 7) can be formed as the elastic member by cutting and raising the metal heat sink 4. The leaf springs 110 contact with the convex components 72 of the light guide plate 7, respectively, such that the leaf springs 110 bias the light guide plate 7 toward the LEDs 52 of the LED module 5. In the first modification example shown in FIG. 7, a pair of spacer members 109 (only one is shown in FIG. 7) is disposed between the LED board 51 of the LED module 5 and the light guide plate 7 in the Y direction. Of course, alternatively, the first modification example can include the spacer members 9 shown in FIG. 6. Alternatively or additionally, as a second modification example shown in FIG. 8, a pair of plastic springs 120 (only one is shown in FIG. 8) can be integrally molded with the rear frame 2 as the elastic member. The plastic springs 120 contact with the convex components 72 of the light guide plate 7, respectively, such that the plastic springs 120 bias the light guide plate 7 toward the LEDs 52 of the LED module 5. In the second modification example shown in FIG. 8, the pair of the spacer members 109 (only one is shown in FIG. 8) is disposed between the LED board 51 of the LED module 5 and the light guide plate 7 in the Y direction. Of course, alternatively, the second modification example can include the spacer members 9 shown in FIG. 6. In view of the similarity, the parts of the first and second modification examples that are substantially identical to the parts of the illustrated embodiment shown in FIGS. 1 to 6 will be given the same reference numerals as the parts of the illustrated embodiment shown in FIGS. 1 to 6. Moreover, the descriptions of the parts of the first and second modification examples that are identical to the parts of the illustrated embodiment may be omitted for the sake of brevity.

In the illustrated embodiment, an example is given in which the spacer members 9 are provided near both ends of the LED module 5 (light source substrate 51) in the lengthwise direction. However, the present invention is not limited to or by this. For example, as long as the spacer members 9 are disposed somewhere other than the region where the light guide plate 7 and the LEDs 52 (light source) are opposite each other, the spacer members 9 can be provided somewhere other than near both ends of the light source substrate 51 in the lengthwise direction.

Figure 9:
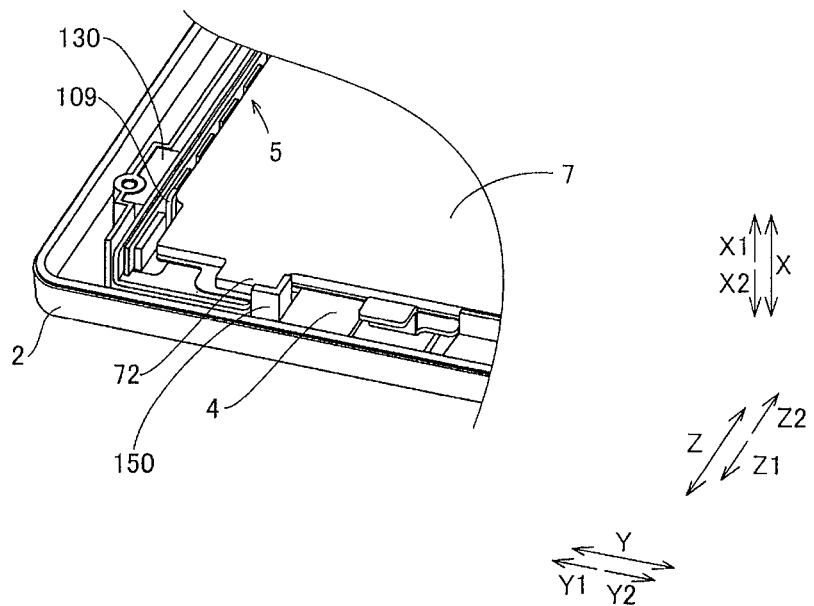
FIG. 9 is an enlarged, partial perspective view of an inside configuration of a TV in accordance with a third modification example.
Figure 10:
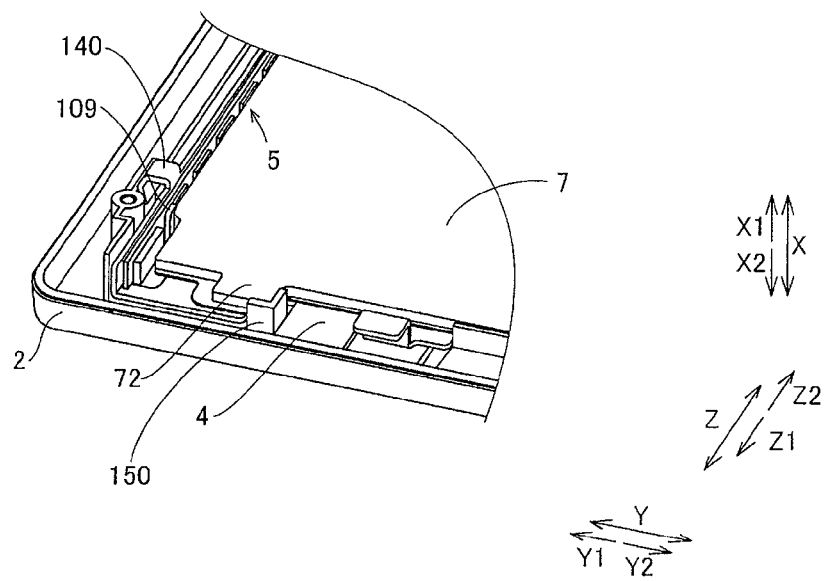
FIG. 10 is an enlarged, partial perspective view of an inside configuration of a TV in accordance with a fourth modification example.

In the illustrated embodiment, an example is given in which the light guide plate 7 is biased toward the LEDs 52 (light source). However, the present invention is not limited to or by this. For example, the light source can instead be biased toward the light guide plate. Furthermore, the light guide plate can be biased toward the light source and the light source biased toward the light guide plate. More specifically, as a third modification example shown in FIG. 9, the LEDs 52 of the LED module 5 can be biased toward the light guide plate 7 by a pair of foams 130 (form material) (only one is shown in FIG. 9) serving as an elastic member. The foams 130 are disposed on the Y1 direction side of the LED module 5 between the LED module 5 and the retainer 21 (FIG. 2) of the rear frame 2. In the third modification example shown in FIG. 9, the pair of the spacer members 109 (only one is shown in FIG. 9) is disposed between the LED board 51 of the LED module 5 and the light guide plate 7 in the Y direction. Of course, alternatively, the second modification example can include the spacer members 9 shown in FIG. 6. Alternatively or additionally, as a fourth modification example shown in FIG. 10, the LEDs 52 of the LED module 5 can be biased toward the light guide plate 7 by a pair of leaf springs 140 (only one is shown in FIG. 10) serving as an elastic member. The leaf springs 140 are disposed on the Y1 direction side of the LED module 5. In these cases, a pair of stoppers 150 (only one is shown in FIGS. 9 and 10) can be provided such that the stoppers 150 contact the convex components 72 of the light guide plate 7 and restrict movement of the light guide plate 7 in the opposite direction (Y2 direction) from the light source side. In view of the similarity, the parts of the third and fourth modification examples that are substantially identical to the parts of the illustrated embodiment shown in FIGS. 1 to 6 will be given the same reference numerals as the parts of the illustrated embodiment shown in FIGS. 1 to 6. Moreover, the descriptions of the parts of the third and fourth modification examples that are identical to the parts of the illustrated embodiment may be omitted for the sake of brevity.

Figure 11:
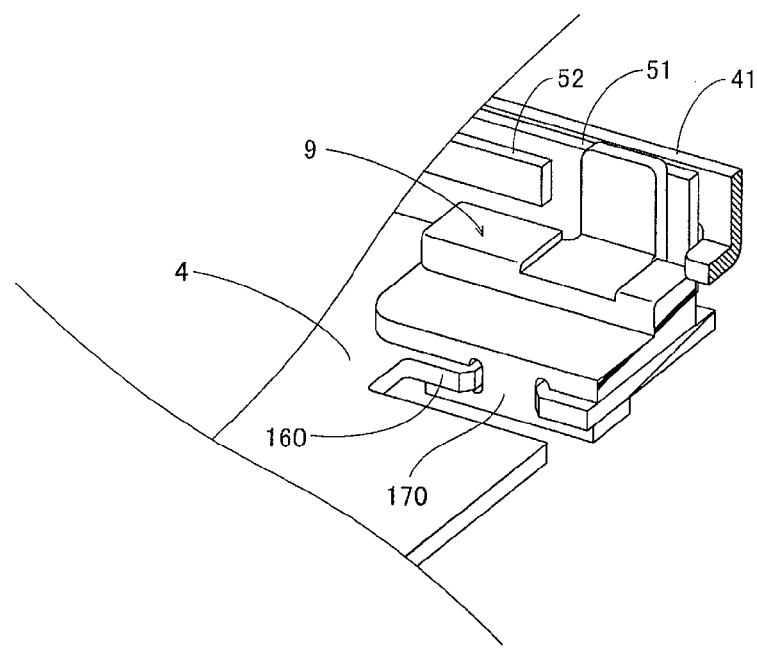
FIG. 11 is an enlarged, partial perspective view of an inside configuration of a TV in accordance with a fifth modification example.

In the illustrated embodiment, an example is given in which the bosses 92 formed on the spacer members 9 are engaged with the holes 43 provided to the heat sink 4, thereby fixing the spacer members 9 relative to the heat sink 4. However, the present invention is not limited to or by this. For example, as a fifth modification example shown in FIG. 11, the spacer members 9 (only one is shown in FIG. 11) can be fixed by engaging a prong 170 of the spacer members 9 with a cut-out 160 provided to the heat sink 4. Specifically, as shown in FIG. 11, the prong 170 of the spacer member 9 has a pair of distal end portions. The distal end portions of the prong 170 is inserted through the cut-out 160 and slid such that the distal end portions of the prong 170 engages with edge portions of the heat sink 4 that define the cut-out 160 on a rear surface of the heat sink 4, as shown in FIG. 11. Thus, the spacer members 9 are coupled to the heat sink 4. Alternatively, the spacer members can be fixed to the heat sink with an adhesive agent or double-sided tape.

In the illustrated embodiment, a display device includes a display component, a light source, a light guide plate, a spacer member, and a biasing member. The display component displays images. The light source emits light. The light guide plate has a light incident face on which the light emitted from the light source is directly incident. The light guide plate guides the light emitted from the light source to the display component. The spacer member is disposed in a region other than where the light guide plate and the light source are opposite each other such that the spacer member maintains a specific spacing between the light source and the light incident face of the light guide plate. The biasing member is arranged to bias at least one of the light source and the light guide plate towards the other of the light source and the light guide plate.

With this display device, as discussed above, the spacer member is disposed in a region other than the region where the light guide plate and the light source are opposite each other. The spacer member is used to maintain the specific spacing between the light source and the light incident face of the light guide plate. The biasing member biases the light source and/or the light guide plate in a direction in which the light guide plate and the light source move closer together. Consequently, even when the light guide plate has undergone thermal expansion or when the display device is subjected to an impact, the spacer member and the light source are prevented from contacting with each other. Thus, there is less chance that the light source will be damaged. Also, since the spacer member maintains a constant spacing between the light source and the light incident face of the light guide plate, light can be efficiently emitted from the light source and incident on the light guide plate. Also, since the spacer member is not disposed in the region where the light guide plate and the light source are opposite each other, light emitted from the light source can be directly incident on the light guide plate. As a result, the light can be efficiently incident on the light guide plate.

In the illustrated embodiment, the display device further includes a light source substrate having a surface on which the light source is mounted. The spacer member is disposed in a gap between the light incident face of the light guide plate and a region of the surface of the light source substrate other than where the light source is disposed. With this configuration, the spacer member is disposed in a region that is a surface of the light source substrate on the side where the light source is mounted, but not where the light source is disposed. Thus, contact between the spacer member and the light source can be easily suppressed, while allowing light from the light source to be directly and efficiently incident on the light guide plate.

In the illustrated embodiment, the spacer member is disposed adjacent to an imaginary line along which a biasing force of the biasing member is exerted to the one of the light source and the light guide plate. With this configuration, the rotational force (moment force) around the spacer member produced by the biasing force that is exerted on the light source and/or the light guide plate can be reduced near where the spacer member is provided. Thus, the light source or the light guide plate on which the biasing force is exerted will be less likely to end up rotating around the spacer member. This allows a constant spacing to be maintained between the light guide plate and the light source.

In the illustrated embodiment, the biasing member biases the light guide plate towards the light source. The biasing member is disposed adjacent to the light incident face of the light guide plate. With this configuration, it is possible to bias the portion with a shorter distance from the heat source (light source), which is a region of less deformation (expansion and contraction) when the light guide plate undergoes thermal expansion. Thus, the separation of the biasing member and the light guide plate can be suppressed even when the light guide plate is deformed by heat. As a result, the light guide plate can be biased more reliably to the light source side.

In the illustrated embodiment, the display device further includes a metal heat sink. The heat sink is disposed on an opposite side of the light guide plate relative to a light emission face of the light guide plate. The heat sink radiates heat generated by the light source. The heat sink has a biasing member support integrally formed with the heat sink. The biasing member support protrudes towards the light guide plate. The biasing member is attached to the biasing member support of the heat sink. With this configuration, since the biasing member support to which the biasing member is attached can be formed integrally with the heat sink, the increase in the number of parts is less than when the biasing member support is provided separately.

In the illustrated embodiment, the display device further includes a stopper member arranged to restrict movement of the light guide plate away from the light source. The biasing member is arranged to bias the light source toward the light guide plate. The stopper member contacts with the light guide plate such that the stopper member restricts the movement of the light guide plate away from the light source while the biasing member biases the light source toward the light guide plate. With this configuration, since movement of the light guide plate in the opposite direction from the light source side can be restricted by the stopper member, a constant spacing can be maintained between the light source and the light guide plate while biasing the light source toward the light guide plate side.

In the illustrated embodiment, the biasing member includes an elastic member having one of a metal leaf spring, a plastic spring, and silicone rubber. With this configuration, a metal leaf spring, a plastic spring, or silicone rubber can be used to easily bias the light source and/or the light guide plate in a direction in which the light source and the light guide plate move closer together.

In the illustrated embodiment, a plurality of the light sources is disposed along a side edge of a display device main body. The light guide plate has a substantially rectangular shape. The light guide plate includes a pair of convex components on upper and lower sides of the light guide plate, respectively. The biasing member is disposed at positions corresponding to the convex components of the light guide plate. The spacer member is disposed adjacent to the positions corresponding to the convex components of the light guide plate. The biasing member biases the convex components of the light guide plate towards the light sources. With this configuration, the upper and lower sides of the light guide plate can be biased in a balanced fashion toward the plurality of the light sources disposed along the side edge of the display device main body. Thus, a constant spacing can be easily maintained between the plurality of light sources and the light incident face of the light guide plate. Also, unlike the case in which the light guide plate is biased to the light source side by the weight of the light guide plate when the light source is disposed along the lower side (lower part) of the display device main body, even if the light source is disposed along the side edge of the display device main body, the biasing member can bias the light guide plate to the side edge side of the display device main body and maintain a constant spacing between the light source and the light incident face of the light guide plate. Specifically, the biasing member horizontally (in the Y1 direction) biases the light guide plate against the spacer member towards the side edge of the display device main body while the display device is an upright position. The convex components are disposed closer to the light incident face of the light guide plate than the opposite face of the light guide plate opposite the light incident face.

In the illustrated embodiment, a television set includes a receiver, a display component, a light source, a light guide plate, a spacer member, and a biasing member. The receiver receives broadcast signals. The display component displays images. The light source emits light. The light guide plate has a light incident face on which the light emitted from the light source is directly incident. The light guide plate guides the light emitted from the light source to the display component. The spacer member is disposed in a region other than where the light guide plate and the light source are opposite each other. The spacer member maintains a specific spacing between the light source and the light incident face of the light guide plate. The biasing member is arranged to bias one of the light source and the light guide plate towards the other of the light source and the light guide plate.

With this television set, as discussed above, the spacer member is disposed in a region other than the region where the light guide plate and the light source are opposite each other. The spacer member is used to maintain the specific spacing between the light source and the light incident face of the light guide plate. The biasing member biases the light source and/or the light guide plate in a direction in which the light guide plate and the light source move closer together. Consequently, even when the light guide plate has undergone thermal expansion or when the television set is subjected to an impact, the spacer member and the light source are prevented from contacting with each other. Thus, there is less chance that the light source will be damaged. Also, since the spacer member maintains a constant spacing between the light source and the light incident face of the light guide plate, light can be efficiently emitted from the light source and incident on the light guide plate. Also, since the spacer member is not disposed in the region where the light guide plate and the light source are opposite each other, light emitted from the light source can be directly incident on the light guide plate. As a result, the light can be efficiently incident on the light guide plate.

With the display device, as discussed above, when the light guide plate has undergone thermal expansion or when the display device is subjected to an impact, it is less likely that the light source will be damaged, and light can be efficiently emitted from the light source and incident on the light guide plate.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A display device comprising:
   a display component configured to display images;
   a light source configured to emit light;
   a light guide plate configured to guide the light emitted from the light source to the display component, the light guide plate having a light incident face on which the light emitted from the light source is directly incident;
   a spacer member disposed in a region other than where the light guide plate and the light source are opposite each other such that the spacer member maintains a specific spacing between the light source and the light incident face of the light guide plate;
   a biasing member arranged to bias one of the light source and the light guide plate towards the other of the light source and the light guide plate; and
   a metal heat sink configured to radiate heat generated by the light source, the heat sink being disposed on an opposite side of the light guide plate relative to a light emission face of the light guide plate, the heat sink having a biasing member support integrally formed with the heat sink, the biasing member support protruding towards the light guide plate, the biasing member being attached to the biasing member support of the heat sink.

2. The display device according to claim 1, further comprising
   a light source substrate having a surface on which the light source is mounted,
   the spacer member being disposed in a gap between the light incident face of the light guide plate and a region of the surface of the light source substrate other than where the light source is disposed.

3. The display device according to claim 1, wherein
   the spacer member is disposed adjacent to an imaginary line along which a biasing force of the biasing member is exerted to the one of the light source and the light guide plate.

4. The display device according to claim 1, wherein
   the biasing member is disposed adjacent to the light incident face of the light guide plate such that the biasing member biases the light guide plate towards the light source.

5. The display device according to claim 1, further comprising:
   a display device main body; and
   a plurality of the light sources disposed along a side edge of the display device main body,
   the light guide plate having a rectangular shape, the light guide plate including a pair of convex components on upper and lower sides of the light guide plate, respectively,
   the biasing member being disposed at positions corresponding to the convex components of the light guide plate, the biasing member biasing the convex components of the light guide plate towards the light sources such that the light incident face of the light guide plate is pressed against the spacer member, and
   the spacer member being disposed adjacent to the positions corresponding to the convex components of the light guide plate.

6. The display device according to claim 5, wherein
   the biasing member includes an elastic member having one of a metal leaf spring, a plastic spring, and silicone rubber.

7. The display device according to claim 1, wherein
   the heat sink further has a bent part integrally formed along an edge of the heat sink, the biasing member support being spaced apart from the bent part,
   the biasing member being attached to the biasing member support of the heat sink such that the biasing member support of the heat sink extends through a center hole of the biasing member, the biasing member biasing the light guide plate against the spacer member.

8. A television set comprising:
   a receiver configured to receive broadcast signals;
   a display component configured to display images;
   a light source configured to emit light;

a light guide plate configured to guide the light emitted from the light source to the display component, the light guide plate having a light incident face on which the light emitted from the light source is directly incident;

a spacer member disposed in a region other than where the light guide plate and the light source are opposite each other such that the spacer member maintains a specific spacing between the light source and the light incident face of the light guide plate;

a biasing member arranged to bias one of the light source and the light guide plate towards the other of the light source and the light guide plate; and a metal heat sink configured to radiate heat generated by the light source, the heat sink being disposed on an opposite side of the light guide plate relative to a light emission face of the light guide plate, the heat sink having a biasing member support integrally formed with the heat sink, the biasing member support protruding towards the light guide plate, the biasing member being attached to the biasing member support of the heat sink.

a metal heat sink configured to radiate heat generated by the light source, the heat sink having a biasing member support integrally formed with the heat sink, the biasing member support protruding towards the light guide plate, the biasing member being attached to the biasing member support of the heat sink.

* * * * *